United States Patent
Chen et al.

(10) Patent No.: US 10,587,201 B1
(45) Date of Patent: Mar. 10, 2020

(54) METHOD FOR CONTROLLING SMOOTH SWITCHING OF OPERATION DIRECTION OF BIDIRECTIONAL RESONANT CLLC CIRCUIT

(71) Applicant: Zhejiang University, Hangzhou, Zhejiang (CN)

(72) Inventors: Min Chen, Zhejiang (CN); Bodong Li, Zhejiang (CN); Ning Chen, Zhejiang (CN); Xiaoqing Wang, Zhejiang (CN); Lei Jing, Zhejiang (CN); Xinnan Sun, Zhejiang (CN); Dongbo Zhang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 16/453,248

(22) Filed: Jun. 26, 2019

(30) Foreign Application Priority Data

Mar. 12, 2019 (CN) .......................... 2019 1 0185202

(51) Int. Cl.
*H02M 3/335* (2006.01)

(52) U.S. Cl.
CPC .... *H02M 3/33584* (2013.01); *H02M 3/33592* (2013.01)

(58) Field of Classification Search
CPC .. H02M 3/325; H02M 3/335; H02M 3/33569; H02M 3/33576; H02M 3/33584; H02M 3/33592; H02M 1/4242; H02M 2007/4811; H02M 2007/4815; H02M 2007/4818
See application file for complete search history.

(56) References Cited

U.S. PATENT DOCUMENTS

| | | | |
|---|---|---|---|
| 8,587,975 B2 * | 11/2013 | Jain | H02M 3/33584 363/17 |
| 9,520,764 B1 * | 12/2016 | Bundschuh | H02M 1/08 |
| 9,847,727 B1 * | 12/2017 | Chen | H02M 3/33507 |
| 10,141,851 B2 * | 11/2018 | Raju | H02M 3/33507 |
| 2014/0225439 A1 * | 8/2014 | Mao | H02M 3/3376 307/31 |
| 2016/0181933 A1 * | 6/2016 | James | H02J 3/383 363/17 |
| 2017/0070155 A1 * | 3/2017 | Takahara | H02M 3/33569 |

* cited by examiner

*Primary Examiner* — Adolf D Berhane

(57) ABSTRACT

Provided is a method for controlling smooth switching of an operation direction of a bidirectional resonant CLLC circuit, which applies to the bidirectional resonant CLLC circuit. The method includes the following steps: Step 1: detecting a current circuit state and controlling the bidirectional resonant CLLC circuit to operate in a forward operation state by means of a primary bridge and a secondary bridge, by a controller; Step 2: performing Step 3 when an externally transmitted reference signal received by the controller or an internal preset reference signal in the controller is an operation direction switching signal; Step 3: performing frequency conversion control, by the controller; Step 4: performing preparation of phase shift control and generating a driving signal of the secondary bridge, by the controller; Step 5: performing the phase shift control, by the controller; and Step 6: switching a circuit operation state to an inverse operation mode.

5 Claims, 2 Drawing Sheets

METHOD FOR CONTROLLING SMOOTH SWITCHING OF OPERATION DIRECTION OF BIDIRECTIONAL RESONANT CLLC CIRCUIT

CROSS REFERENCE TO RELATED APPLICATIONS

The present application claims the benefit of Chinese Patent Application No. 201910185202.0 filed on Mar. 12, 2019, the contents of which are incorporated herein by reference in its entirety.

FIELD OF THE INVENTION

The present disclosure relates to a method for controlling smooth switching of an operation direction of a bidirectional resonant CLLC circuit, relates to operation mode control of the bidirectional resonant CLLC circuit, and belongs to the field of DCDC converter application. The present disclosure relates to bidirectional flow of electrical energy, meanwhile relates to multiple application occasions, in particular, to scheduling and management of energy storage equipment, and belongs to the field of electric power industry.

BACKGROUND OF THE INVENTION

Energy Internet is a future development trend of the electric power industry. With rapid development of large-scale centralized new energy power generation, distributed power generation, power grid frequency modulation services, and micro power grid technology, there is a great demand for energy storage equipment. The addition of energy storage equipment in a power system can suppress fluctuation of power grid brought by the connection of large-scale new energy power generation to the power grid, turn a "rigid" power system into a "flexible" power system, and improve safety, economical efficiency, and flexibility of the power system during operation.

The energy storage equipment has dual attributes of "generation" and "load", and a converter for connecting the energy storage equipment and the power grid also needs to have a bidirectional operation function. Currently, there are mainly two types of bidirectional isolation circuits: bidirectional resonant CLLC circuit and bidirectional active bridge circuit.

The bidirectional resonant CLLC circuit has advantages such as high efficiency, high power density, and wide voltage input range. However, the traditional method for controlling the bidirectional resonant CLLC circuit is frequency conversion control. When an input voltage and an output voltage are the same, the larger a switching frequency of the bidirectional resonant CLLC circuit is, the smaller the power transmitted by the circuit is; and when the power transmitted by the circuit is zero, the switching frequency is infinite theoretically. Since an operation switch frequency of a power device is limited, the power transmitted by a circuit cannot be reduced to a small extent. As a result, smooth switching of an operation direction of the bidirectional resonant CLLC circuit cannot be achieved only by the traditional frequency conversion control.

Although the bidirectional active bridge circuit has problems of large off-current and circulating current, it can achieve smooth switching of an operation direction. At present, on occasions where fast and stable switching of the operation direction is required, such as scheduling of energy storage equipment, V2G technology of electric vehicles, and energy feedback, only the bidirectional active bridge circuit can be used. Application of a traditional bidirectional resonant CLLC circuit is restricted on these occasions by its shortcoming of not being able to achieve smooth switching of an operation direction.

Therefore, it is desirable to make improvements to existing technologies.

SUMMARY OF THE INVENTION

The technical problem to be solved by the present application is to provide a high-efficiency method for controlling smooth switching of an operation direction of a bidirectional resonant CLLC circuit.

In order to solve the above technical problem, the present disclosure provides a method for controlling smooth switching of an operation direction of a bidirectional resonant CLLC circuit, used for a bidirectional resonant CLLC circuit, and the method includes the following steps:

Step 1: detecting a current circuit state, generating a circuit control signal based on the circuit state and an externally transmitted reference signal or an internal preset reference signal, and controlling the bidirectional resonant CLLC circuit to operate in a forward operation state by means of a primary bridge and a secondary bridge, by a controller;

Step 2: performing Step 3 when the externally transmitted reference signal received by the controller or the internal preset reference signal in the controller is an operation direction switching signal;

Step 3: performing frequency conversion control, by the controller, wherein a forward operation switch frequency $f_{s\_forward}$ in a current control cycle is compared with a forward operation maximum switch frequency $f_{s\_forward.max}$, wherein if "$f_{s\_forward} < f_{s\_forward.max}$", the forward operation switch frequency $f_{s\_forward}$ is increased, and Step 3 is repeated; and if "$f_{s\_forward} \geq f_{s\_forward.max}$", Step 4 is performed;

Step 4: performing preparation of phase shift control and generating a driving signal of the secondary bridge, by the controller, wherein a phase of the driving signal of the secondary bridge lags behind a driving signal of the primary bridge by an angle of $\varphi_{forward.max}$, $\varphi_{forward.max}$ being a starting phase shift angle for the phase shift control;

Step 5: performing the phase shift control, by the controller, wherein the controller compares a phase angle difference $\varphi_{forward}$ between the driving signal of the secondary bridge and the driving signal of the primary bridge in the current control cycle and a minimum phase angle difference $\varphi_{forward.min}$, the minimum phase angle difference $\varphi_{forward.min}$ being a termination phase angle difference for the phase shift control, wherein if "$\varphi_{forward} > \varphi_{forward.min}$", the phase angle difference $\varphi_{forward}$ between the driving signal of the secondary bridge and the driving signal of the primary bridge is reduced, and Step 5 is repeated; and if "$\varphi_{forward} \leq \varphi_{forward.min}$", Step 6 is performed; and Step 6: switching a circuit operation state to an inverse operation mode, wherein the controller generates a circuit control signal based on the circuit operation state and an externally transmitted reference signal or an internal preset reference signal so as to control the bidirectional resonant CLLC circuit to operate in an inverse operation state by means of the primary bridge and the secondary bridge.

As an improvement to the method for controlling smooth switching of an operation direction of a bidirectional resonant CLLC circuit:

in Step 3, the frequency conversion control is performed by the controller, wherein the forward operation switch frequency $f_{s.forward}$ in the current control cycle is compared with the forward operation maximum switch frequency $f_{s.forward.max}$, wherein if "$f_{s.forward} < f_{s.forward.max}$", $f_{s.forward} = f_{s.forward} + 1$ is executed, and Step 3 is repeated; and if "$f_{s.forward} \geq f_{s.forward.max}$", Step 4 is performed.

As a further improvement to the method for controlling smooth switching of an operation direction of a bidirectional resonant CLLC circuit:

in Step 5, when $\varphi_{forward} > \varphi_{forward.min}$, a method for reducing the phase angle difference $\varphi_{forward}$ between the driving signal of the secondary bridge and the driving signal of the primary bridge is: changing the driving signal of the secondary bridge with the driving signal of the primary bridge remaining the same, so as to reduce the phase angle difference $\varphi_{forward}$ between the driving signal of the secondary bridge and the driving signal of the primary bridge.

As a further improvement to the method for controlling smooth switching of an operation direction of a bidirectional resonant CLLC circuit:

in Step 5, when $\varphi_{forward} > \varphi_{forward.min}$, the secondary bridge is reduced by 20° each time.

As a further improvement to the method for controlling smooth switching of an operation direction of a bidirectional resonant CLLC circuit:

in Step 4, in a forward operation mode, when the primary bridge operates at the forward operation maximum switch frequency $f_{s.forward.max}$, and the secondary bridge does not have a driving signal, a phase angle difference between a bridge arm midpoint voltage of the secondary bridge and a bridge arm midpoint voltage of the primary bridge is $\varphi_{forward.max}$; and in step 5: in the inverse operation mode, when the secondary bridge operates at the forward operation maximum switch frequency $f_{s.forward.max}$, and the primary bridge does not have a driving signal, a phase angle difference between a bridge arm midpoint voltage of the secondary bridge and a bridge arm midpoint voltage of the primary bridge is $\varphi_{forward.min}$.

The method for controlling smooth switching of an operation direction of a bidirectional resonant CLLC circuit in the present disclosure has the following technical advantages.

The present disclosure has the following features:

(1) The control method of the present disclosure combines frequency conversion control and phase shift control, and achieves, without adding any additional hardware, a function of operation direction switching of the bidirectional resonant CLLC circuit which traditional frequency conversion control cannot achieve.

(2) Whether it is an external reference signal obtained by communication transmission or a reference signal preset in a controller, the control method of the present disclosure can quickly respond to a change of the reference signal and change an operation state of the bidirectional resonant CLLC circuit, so as to achieve a function of energy scheduling.

BRIEF DESCRIPTION OF THE DRAWINGS

The present disclosure will be further explained in detail with reference to the accompanying drawings.

In FIG. 1: $V_1$ and $I_1$ respectively represent an input voltage and an input current at a primary side, and $V_2$ and $I_2$ respectively represent an output voltage and an output current at a secondary side; a power transmission state can be obtained based on above variables, a calculation formula of an input power being "$P_2 = V_1 I_1$", a calculation formula of an output power being "$P_2 = V_2 I_2$". Switches $Q_1$ to $Q_4$ form a primary bridge; switches $Q_5$ to $Q_8$ form a secondary bridge; and a primary resonant inductor $L_{r1}$, a primary resonant capacitor $C_{r1}$, a primary excitation inductor $L_{m1}$, a secondary resonant inductor $L_{r2}$, and a secondary resonant capacitor $C_{r2}$ form a CLLC resonant cavity. A voltage between node A and node B is a bridge arm midpoint voltage of the primary bridge, and a voltage between node C and node D is a bridge arm midpoint voltage of the secondary bridge. $C_1$ and $C_2$ respectively represent an input stabilizing capacitor at the primary side and an output stabilizing capacitor at the secondary side. An externally transmitted reference signal is transmitted by a communication device from outside to the controller.

DETAILED DESCRIPTION OF THE EMBODIMENTS

The present disclosure will be further explained in detail with reference to specific embodiments. However, the protection scope of the present disclosure is not limited to these specific embodiments.

Figure 1:
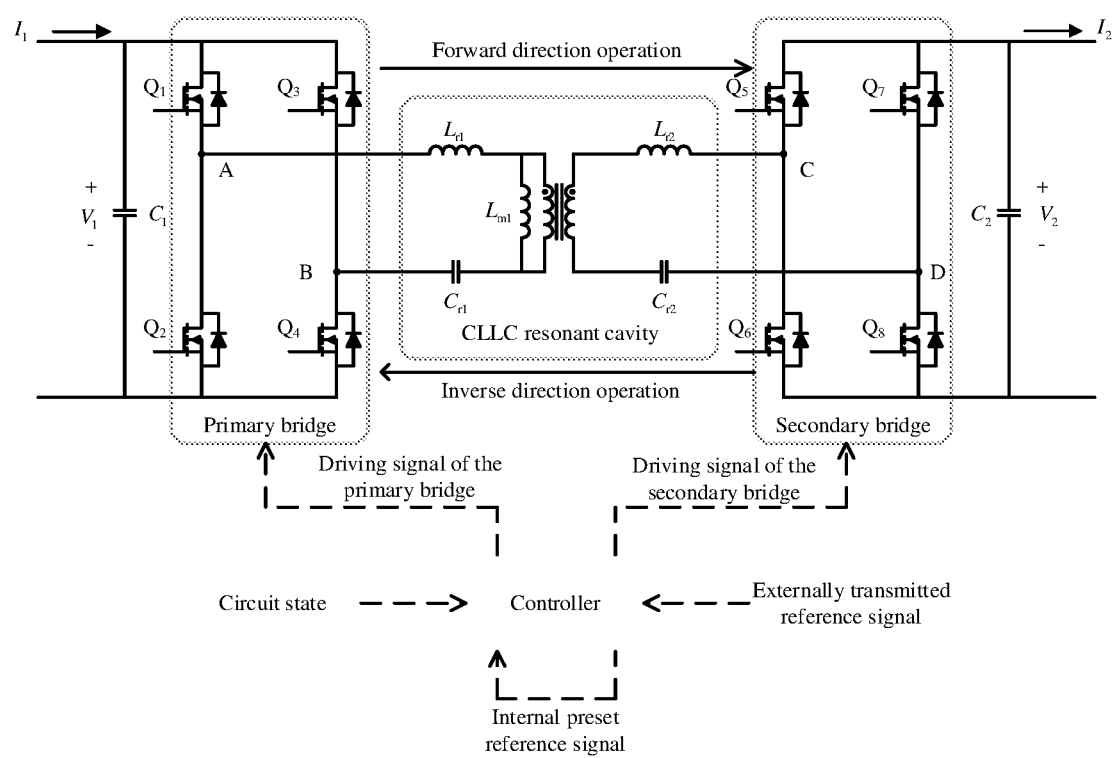
FIG. 1 schematically shows a bidirectional resonant CLLC circuit and a controller thereof.

A controller of a bidirectional resonant CLLC circuit in embodiment 1 applies to a bidirectional resonant CLLC circuit. As shown in FIG. 1, the bidirectional resonant CLLC circuit includes a primary bridge, a secondary bridge, and a CLLC resonant cavity. The controller performs control by generating a circuit control signal based on a circuit state and an externally transmitted reference signal or an internal preset reference signal.

The primary bridge includes a first bridge arm and a second bridge arm in parallel connection with each other. The first bridge arm includes a first switch tube $Q_1$ and a second switch tube $Q_2$ in serial connection with each other, and the second bridge arm includes a third switch tube $Q_3$ and a fourth switch tube $Q_4$ in serial connection with each other. A first node A is provided between the first switch tube $Q_1$ and the second switch tube $Q_2$, and the first node A is connected to a first end of the CLLC resonant cavity at a primary side. A second node B is provided between the third switch tube $Q_3$ and the fourth switch tube $Q_4$, and the second node B is connected to a second end of the CLLC resonant cavity at the primary side.

The secondary bridge includes a third bridge arm and a fourth bridge arm in parallel connection with each other. The third bridge arm includes a fifth switch tube $Q_5$ and a sixth switch tube $Q_6$ in serial connection with each other, and the fourth bridge arm includes a seventh switch tube $Q_7$ and an eighth switch tube $Q_8$ in serial connection with each other. A third node C is provided between the fifth switch tube $Q_5$ and the sixth switch tube $Q_6$, and the third node C is connected to a first end of the CLLC resonant cavity at a secondary side. A fourth node D is provided between the seventh switch tube $Q_7$ and the eighth switch tube $Q_8$, and the fourth node D is connected to a second end of the CLLC resonant cavity at the secondary side.

The CLLC resonant cavity includes a primary resonant inductor $L_{r1}$, a primary resonant capacitor $C_{r1}$, a primary excitation inductor $L_{m1}$, a secondary resonant inductor $L_{r2}$, and a secondary resonant capacitor $C_{r2}$. The primary resonant inductor $L_{r1}$, the primary resonant capacitor $C_{r1}$, and the primary excitation inductor $L_{m1}$ are arranged at the primary side of the CLLC resonant cavity, and the secondary resonant inductor $L_{r2}$ and the secondary resonant capacitor $C_{r2}$ are arranged at the secondary side of the CLLC resonant cavity.

A control method of a controller of the bidirectional resonant CLLC circuit is as follows.

Before the controller receives a switching signal (the controller may also perform switching automatically at regular times or perform a switching action automatically based on some conditions of a local circuit), a current operation direction is set to be forward, and the controller generates a driving signal of a primary bridge based on a detected current circuit state and an externally transmitted reference signal or an internal preset reference signal. Duty cycles of driving signals of four switch tubes (a first switch tube $Q_1$, a second switch tube $Q_2$, a third switch tube $Q_3$, and a fourth switch tube $Q_4$) of the primary bridge are all 0.5, and driving waveforms of the first switch tube $Q_1$ and the fourth switch tube $Q_4$ are identical. The second switch tube $Q_2$ and the third switch tube $Q_3$ are the same, and the first switch tube $Q_1$ and the second switch tube $Q_2$ are complementary to each other. In particular, in practical application, a dead zone time (a specific value thereof is adjusted based on an experiment test result) should be added between switching of the first switch tube $Q_1$ and the second switch tube $Q_2$ based on switch characteristics of the switch tubes, and therefore the duty cycles of the driving signals are slightly less than 0.5. The controller changes switch frequencies of the switch tubes (the first switch tube $Q_1$, the second switch tube $Q_2$, the third switch tube $Q_3$, and the fourth switch tube $Q_4$) by changing a frequency of the driving signal of the primary bridge so as to further control an operation state of a bidirectional resonant CLLC circuit.

When the switching signal is received by the controller, smooth switching of an operation direction of the bidirectional resonant CLLC circuit can be achieved by a control method which combines frequency conversion control and phase shift control.

Figure 2:
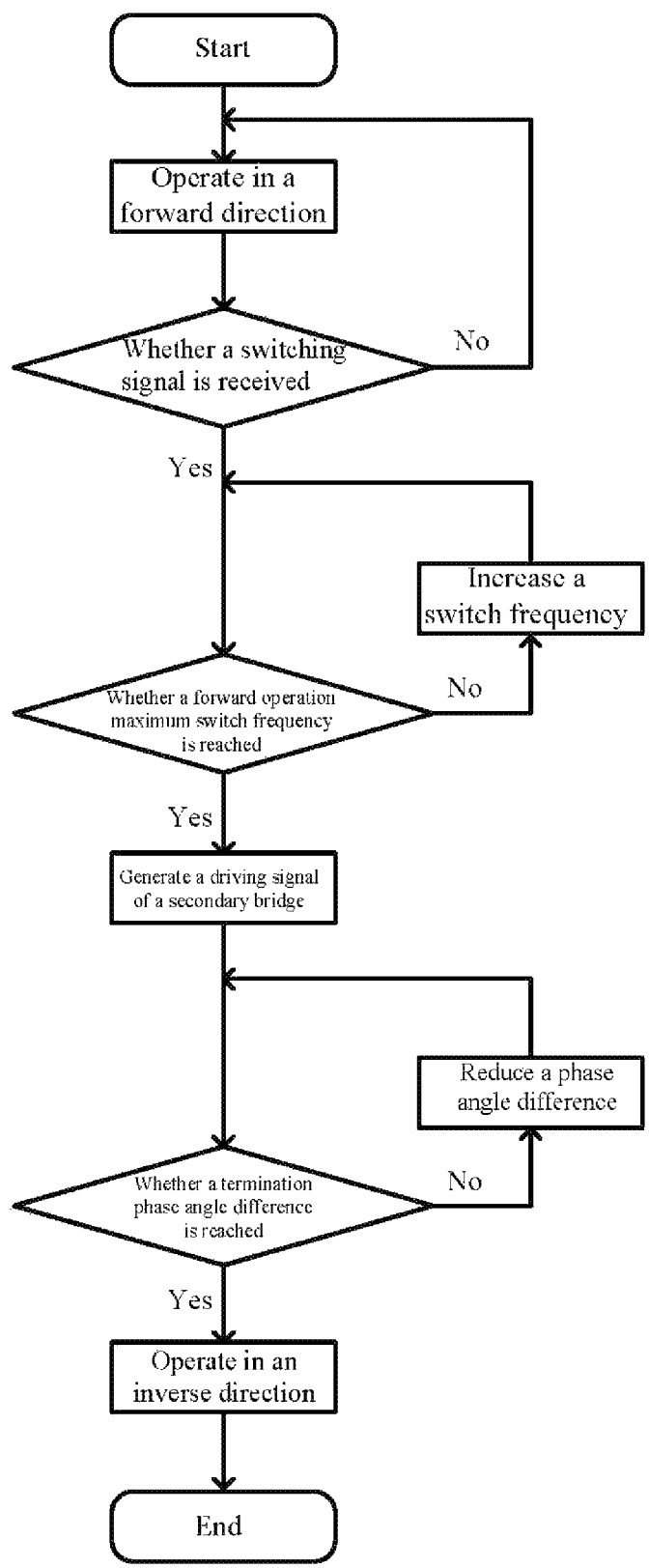
FIG. 2 shows a flow chart of a method for controlling smooth switching of an operation direction of a bidirectional resonant CLLC circuit mentioned in the present disclosure.

The method can achieve free switching between two operation directions. Taking switching from a forward operation direction to an inverse operation direction for example, a flowchart of the method for smooth switching of the operation direction of the bidirectional resonant CLLC circuit is as shown in FIG. 2, and steps for implementing the method are as follows.

Step 1: During each control cycle, the controller detects a current circuit state, and generates a circuit control signal based on the circuit state and an externally transmitted reference signal or an internal preset reference signal. The controller transmits the circuit control signal to the primary bridge and a secondary bridge (at this time, the secondary bridge is a synchronous rectifier) to ensure that the bidirectional resonant CLLC circuit stably operates in a forward operation state by means of the primary bridge and the secondary bridge.

Step 2: During an $n^{th}$ control cycle, when the externally transmitted reference signal received by the controller or the internal preset reference signal in the controller is an operation direction switching signal, the controller performs a switching action.

Step 3: The controller performs frequency conversion control. A forward operation switch frequency $f_{s,forward}$ in a current control cycle is compared with a forward operation maximum switch frequency $f_{s,forward.max}$, and $f_{s,forward.max}$ is a termination switch frequency of the frequency conversion control. If "$f_{s,forward} < f_{s,forward.max}$", the forward operation switch frequency $f_{s,forward}$ is increased, and Step 3 is repeated (an increased amount is a step length, and the step length affects a response speed; if the response speed is too fast, a system is not stable, and if the response speed is too slow, the system has a slow adjustment speed; and in the present disclosure, $f_{s,forward}=f_{s,forward}+1$, which can ensure both system stability and the adjustment speed); and if "$f_{s,forward} \geq f_{s,forward.max}$", Step 4 is performed.

$f_{s,forward.max}$ is an upper limit of the forward operation switch frequency of the bidirectional resonant CLLC circuit set based on the circuit and performance parameters of switches.

Step 4: The controller performs preparation of the phase shift control, and generates a driving signal of the secondary bridge. A phase of the driving signal of the secondary bridge lags behind the driving signal of the primary bridge by an angle of $\varphi_{forward.max}$, $\varphi_{forward.max}$ being a starting phase shift angle of the phase shift control.

In a forward operation mode, when the primary bridge operates at the forward operation maximum switch frequency $f_{s,forward.max}$, and the secondary bridge does not have a driving signal, a phase angle difference between a bridge arm midpoint voltage of the secondary bridge and a bridge arm midpoint voltage of the primary bridge is $\varphi_{forward.max}$.

Step 5: The controller performs the phase shift control, and the controller compares a phase angle difference $\varphi_{forward}$ between the driving signal of the secondary bridge and the driving signal of the primary bridge in the current control cycle and a minimum phase angle difference $\varphi_{forward.min}$, the minimum phase angle difference $\varphi_{forward.min}$ being a termination phase angle difference for the phase shift control.

If "$\varphi_{forward} > \varphi_{forward.min}$", the phase angle difference $\varphi_{forward}$ between the driving signal of the secondary bridge and the driving signal of the primary bridge is reduced, and Step 5 is repeated. The reduction is performed as follows. With the driving signal of the primary bridge remaining the same, the driving signal of the secondary bridge is changed so as to reduce the phase angle difference $\varphi_{forward}$ between the driving signal of the secondary bridge and the driving signal of the primary bridge. A total of 20° (measured by 360°) is shifted at each reduction, and the shift is completed within 0.2 second. Now, 20000 times of calculation are performed within one second, then 4000 times of calculation are performed within 0.2 second, and therefore a shift at each time is $5*10^{-3}°$.

If "$\varphi_{forward} \leq \varphi_{forward.min}$", Step 6 is performed.

In an inverse operation mode, when the secondary bridge operates at the forward operation maximum switch frequency $f_{s,forward.max}$, and the primary bridge does not have a driving signal, a phase angle difference between a bridge arm midpoint voltage of the secondary bridge and a bridge arm midpoint voltage of the primary bridge is $\varphi_{forward.min}$.

Step 6: A circuit operation state is switched to the inverse operation mode. The controller detects a current circuit state, and generates a circuit control signal based on the circuit state and an externally transmitted reference signal or an internal preset reference signal. The controller transmits the circuit control signal to the primary bridge and the secondary bridge to ensure that the bidirectional resonant CLLC circuit stably operates in an inverse operation state by means of the primary bridge and the secondary bridge.

The circuit state includes but is not limited to states of an input voltage and an input current at the primary side, states of an output voltage and an output current at the secondary side, and a power transmission state; and the externally transmitted reference signal or the internal preset reference signal includes but is not limited to modifications to target values of the states of the input voltage and the input current at the primary side, the states of the output voltage and the output current at the secondary side, and the power transmission state.

Communication modes related to the externally transmitted reference signal include but are not limited to the following: (a) wire communications such as CAN communications, optical fiber communications, and ethernet communications; and (b) wireless communications such as WiFi, ZigBee, Bluetooth, and infrared.

Finally, it should also be noted that the above examples are only a few specific embodiments of the present disclosure. Obviously, the present disclosure is not limited to the above embodiments, and can have many variations. All variations that can be directly derived or conceived by a person of ordinary skill in the art from the content of the present disclosure are considered to be within the scope of the present disclosure.

The invention claimed is:

1. A method for controlling smooth switching of an operation direction of a bidirectional resonant CLLC circuit, used in a bidirectional resonant CLLC circuit, wherein the method comprises following steps:
    Step 1: detecting a current circuit state, generating a circuit control signal based on the circuit state and an externally transmitted reference signal or an internal preset reference signal, and controlling the bidirectional resonant CLLC circuit to operate in a forward operation state by means of a primary bridge and a secondary bridge, by a controller;
    Step 2: performing Step 3 when the externally transmitted reference signal received by the controller or the internal preset reference signal in the controller is an operation direction switching signal;
    Step 3: performing frequency conversion control, by the controller, wherein a forward operation switch frequency $f_{s.forward}$ in a current control cycle is compared with a forward operation maximum switch frequency $f_{s.forward.max}$, wherein if "$f_{s.forward}<f_{s.forward.max}$", the forward operation switch frequency $f_{s.forward}$ is increased, and Step 3 is repeated; and if "$f_{s.forward}\geq f_{s.forward.max}$", Step 4 is performed;
    Step 4: performing preparation of phase shift control and generating a driving signal of the secondary bridge, by the controller, wherein a phase of the driving signal of the secondary bridge lags behind a driving signal of the primary bridge by an angle of $\varphi_{forward.max}$, $\varphi_{forward.max}$ being a starting phase shift angle for the phase shift control;
    Step 5: performing the phase shift control, by the controller, wherein the controller compares a phase angle difference $\varphi_{forward}$ between the driving signal of the secondary bridge and the driving signal of the primary bridge in the current control cycle and a minimum phase angle difference $\varphi_{forward.min}$, the minimum phase angle difference $\varphi_{forward.min}$ being a termination phase angle difference for the phase shift control, wherein if "$\varphi_{forward}>\varphi_{forward.min}$", the phase angle difference $\varphi_{forward}$ between the driving signal of the secondary bridge and the driving signal of the primary bridge is reduced, and Step 5 is repeated; and if "$\varphi_{forward}\leq\varphi_{forward.min}$", Step 6 is performed; and
    Step 6: switching a circuit operation state to an inverse operation mode, wherein the controller generates a circuit control signal based on the circuit operation state and an externally transmitted reference signal or an internal preset reference signal so as to control the bidirectional resonant CLLC circuit to operate in an inverse operation state by means of the primary bridge and the secondary bridge.

2. The method for controlling smooth switching of an operation direction of a bidirectional resonant CLLC circuit according to claim 1, wherein:
    in Step 3, the frequency conversion control is performed by the controller, wherein the forward operation switch frequency $f_{s.forward}$ in the current control cycle is compared with the forward operation maximum switch frequency $f_{s.forward.max}$, wherein if "$f_{s.forward}<f_{s.forward.max}$", $f_{s.forward}=f_{s.forward}+1$ is executed, and Step 3 is repeated; and if "$f_{s.forward}\geq f_{s.forward.max}$", Step 4 is performed.

3. The method for controlling smooth switching of an operation direction of a bidirectional resonant CLLC circuit according to claim 2, wherein:
    in Step 5, when $\varphi_{forward}>\varphi_{forward.min}$, a method for reducing the phase angle difference $\varphi_{forward}$ between the driving signal of the secondary bridge and the driving signal of the primary bridge is: changing the driving signal of the secondary bridge with the driving signal of the primary bridge remaining the same, so as to reduce the phase angle difference $\varphi_{forward}$ between the driving signal of the secondary bridge and the driving signal of the primary bridge.

4. The method for controlling smooth switching of an operation direction of a bidirectional resonant CLLC circuit according to claim 3, wherein: in Step 5, when $\varphi_{forward}>\varphi_{forward.min}$, the secondary bridge is reduced by 20° each time.

5. The method for controlling smooth switching of an operation direction of a bidirectional resonant CLLC circuit according to claim 4, wherein:
    in Step 4, in a forward operation mode, when the primary bridge operates at the forward operation maximum switch frequency $f_{s.forward.max}$, and the secondary bridge does not have a driving signal, a phase angle difference between a bridge arm midpoint voltage of the secondary bridge and a bridge arm midpoint voltage of the primary bridge is $\varphi_{forward.max}$; and
    in step 5: in the inverse operation mode, when the secondary bridge operates at the forward operation maximum switch frequency $f_{s.forward.max}$, and the primary bridge does not have a driving signal, a phase angle difference between a bridge arm midpoint voltage of the secondary bridge and a bridge arm midpoint voltage of the primary bridge is $\varphi_{forward.min}$.

* * * * *